United States Patent
Chen et al.

(10) Patent No.: US 9,678,951 B2
(45) Date of Patent: *Jun. 13, 2017

(54) DYNAMIC TRANSLATION SUBSTITUTION

(71) Applicant: International Business Machines Corporation, Armonk, NY (US)

(72) Inventors: Guoyou Chen, Austin, TX (US); William B. Huber, Rye, NY (US); Su Liu, Round Rock, TX (US); Jennifer D. Mulsow, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 321 days.

This patent is subject to a terminal disclaimer.

(21) Appl. No.: 13/763,783

(22) Filed: Feb. 11, 2013

(65) Prior Publication Data

US 2013/0346064 A1    Dec. 26, 2013

Related U.S. Application Data

(63) Continuation of application No. 13/528,895, filed on Jun. 21, 2012.

(51) Int. Cl.
| | |
|---|---|
| *G06F 17/21* | (2006.01) |
| *G06F 17/27* | (2006.01) |
| *G06F 17/28* | (2006.01) |

(52) U.S. Cl.
CPC ........... *G06F 17/289* (2013.01); *G06F 17/21* (2013.01); *G06F 17/27* (2013.01); *G06F 17/275* (2013.01); *G06F 17/2735* (2013.01)

(58) Field of Classification Search
USPC ..... 704/1–4, 5–8, 9–10, 200, 270–272, 277, 704/278, E13.011–E13.014
See application file for complete search history.

(56) References Cited

U.S. PATENT DOCUMENTS

| | | | |
|---|---|---|---|
| 5,490,061 A | * | 2/1996 | Tolin et al. ............. 704/2 |
| 5,778,380 A | * | 7/1998 | Siefert |

(Continued)

FOREIGN PATENT DOCUMENTS

| | | |
|---|---|---|
| CN | 1494695 A | 5/2004 |
| CN | 1575452 A | 2/2005 |

(Continued)

OTHER PUBLICATIONS

U.S. Appl. No. 13/528,895, 1 page.

(Continued)

*Primary Examiner* — Pierre-Louis Desir
*Assistant Examiner* — David Kovacek
(74) *Attorney, Agent, or Firm* — Francis Lammes; Stephen J. Walder, Jr.; Thomas E. Tyson

(57) ABSTRACT

Mechanisms are provided for translating messages output by processes associated with the data processing system. Language based user activities occurring via a data processing system are tracked and automatically analyzed to determine a relative priority ordering of one or more languages used by a user performing the user activities. A sequence of preferred language translation substitutions is generated for outputting messages based on results of the analysis and is automatically applied to a received message from a process associated with the data processing system to generate a translated message using one of the preferred language translation substitutions in the sequence of preferred language translation substitutions. The translated message is output via an output device of the data processing system.

7 Claims, 4 Drawing Sheets

(56) References Cited

U.S. PATENT DOCUMENTS

| | | | |
|---|---|---|---|
| 6,119,079 A * | 9/2000 | Wang et al. | 704/8 |
| 6,275,789 B1 * | 8/2001 | Moser et al. | 704/7 |
| 6,356,865 B1 * | 3/2002 | Franz et al. | 704/2 |
| 6,396,515 B1 | 5/2002 | Hetherington et al. | |
| 6,526,426 B1 * | 2/2003 | Lakritz | 715/264 |
| 8,788,259 B1 * | 7/2014 | Buryak et al. | 704/8 |
| 2002/0111791 A1 * | 8/2002 | Candelore | 704/7 |
| 2002/0169592 A1 * | 11/2002 | Aityan | 704/2 |
| 2003/0040899 A1 * | 2/2003 | Ogilvie | 704/2 |
| 2003/0046056 A1 * | 3/2003 | Godoy et al. | 704/1 |
| 2003/0046075 A1 * | 3/2003 | Stone | 704/257 |
| 2003/0115552 A1 * | 6/2003 | Jahnke et al. | 715/536 |
| 2004/0111254 A1 * | 6/2004 | Gogel et al. | 704/8 |
| 2004/0122656 A1 * | 6/2004 | Abir | 704/4 |
| 2004/0243392 A1 * | 12/2004 | Chino et al. | 704/7 |
| 2007/0168450 A1 * | 7/2007 | Prajapat et al. | 709/207 |
| 2007/0294078 A1 * | 12/2007 | Kim et al. | 704/2 |
| 2008/0294455 A1 | 11/2008 | Bharara | |
| 2009/0281789 A1 * | 11/2009 | Waibel et al. | 704/3 |
| 2010/0057435 A1 * | 3/2010 | Kent et al. | 704/3 |
| 2010/0286977 A1 * | 11/2010 | Chin et al. | 704/4 |
| 2011/0010163 A1 * | 1/2011 | Jansen | 704/9 |
| 2011/0231180 A1 * | 9/2011 | Padi et al. | 704/3 |
| 2011/0307243 A1 | 12/2011 | Miller et al. | |
| 2012/0016656 A1 * | 1/2012 | Travieso et al. | 704/2 |
| 2012/0017146 A1 | 1/2012 | Travieso et al. | |
| 2012/0065957 A1 * | 3/2012 | Jungblut | 704/3 |
| 2013/0046544 A1 * | 2/2013 | Kay et al. | 704/275 |
| 2013/0346063 A1 * | 12/2013 | Chen et al. | 704/3 |
| 2013/0346064 A1 * | 12/2013 | Chen et al. | 704/8 |

FOREIGN PATENT DOCUMENTS

| | | |
|---|---|---|
| CN | 101542419 A | 9/2009 |
| CN | 102084417 A | 6/2011 |
| DE | 112006004015 T5 | 7/2009 |

OTHER PUBLICATIONS

"1.6 The translation fallback chain", OLAT (Online Learning and Training), http://www.olat.org/docu/i18n/ch01s06.html, accessed Jun. 15, 2012, 2 pages.

Kubota, Tomohiro, "Introduction to i18n", Debian, Mar. 2, 2008, 124 pages.

Phillips, Addison et al., "Tags for Identifying Languages", RFC, Best Current Practice, RFC 5646, Sep. 2009, 74 pages.

* cited by examiner

DYNAMIC TRANSLATION SUBSTITUTION

This application is a continuation of application Ser. No. 13/528,895, filed Jun. 21, 2012, status pending.

BACKGROUND

The present application relates generally to an improved data processing apparatus and method and more specifically to mechanisms for performing dynamic translation substitution based on real-time analysis of user language related activities.

Modern computing devices are able to display user interface menu names, operation instructions, help and warning messages, and other textual messages in a user defined language based on the user's preferred language setting specified by an environment setting. To facilitate such translations, the display menu names, instructions, help and warning messages, and the like, are provided in translation catalog files where the same textual message is provided in various catalog files, e.g., a catalog file for English, a catalog file for Spanish, a catalog file for Chinese, and the like. The settings of preferred languages for a user are static in nature and are typically specified by the user when initially configuring the operating system, application, or runtime environment.

SUMMARY

In one illustrative embodiment, a method, in a data processing system, is provided for translating messages output by processes associated with the data processing system. The method comprises automatically tracking language based user activities occurring via the data processing system and automatically analyzing the language based user activities to determine a relative priority ordering of one or more languages used by a user performing the user activities. The method further comprises automatically generating a sequence of preferred language translation substitutions for outputting messages based on results of the analysis and automatically applying the sequence to a received message from a process associated with the data processing system to generate a translated message using one of the preferred language translation substitutions in the sequence of preferred language translation substitutions. Furthermore, the method comprises outputting the translated message via an output device of the data processing system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
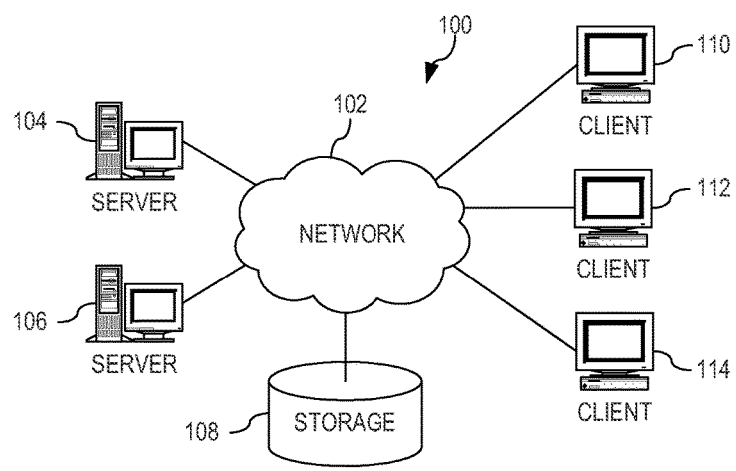
FIG. 1 is an example diagram of a distributed data processing system in which aspects of the illustrative embodiments may be implemented.

The illustrative embodiments provide a dynamic language translation substitution mechanism for use with applications, operating systems, or any other electronic mechanism for generating and outputting alphanumeric electronic messages. The illustrative embodiments may be used to augment static language translation settings by allowing dynamic optimization of these static language translation settings based on a user's language based activities.

Modern computing devices are able to display user interface menu names, operation instructions, help and warning messages, and other textual messages in a user defined language based on the user's preferred language setting specified by an environment setting. To facilitate such translations, the display menu names, instructions, help and warning messages, and the like, are provided in translation catalog files where the same textual message is provided in various catalog files, e.g., a catalog file for English, a catalog file for Spanish, a catalog file for Simplified Chinese, and the like.

For example, the AIX operating system, available from International Business Machines Corporation of Armonk, N.Y., provides a translation catalog facility for all applications. In order to facilitate translations of messages into various languages and make them available to a program based on a user's locale, the AIX mechanisms keep messages separate from the program by providing them in the form of message catalogs that the program can access at run time. To aid in this task, commands and subroutines are provided by the message facility of the AIX operating system. Message source files containing application messages are created by the programmer and converted to message catalogs and the application uses these catalogs to retrieve and display messages as needed. Thus, translating message source files into other languages and then converting the files to message catalogs does not require changing and recompiling the underlying program.

Based on such a catalog based mechanism such as in the AIX operating system, a user obtains a translated message based on his/her language/locale environment setting. For example, a message "Hello World" can be displayed as a pre-translated message "Bonjour Monde" or "Hola Mundo" depending on the user's language setting to French or Spanish. In the real world, however, only a few languages are translated and supported due to expensive translation costs. For example, currently an operation system may enable more than 80 languages, but only translates catalog messages, e.g., operating system menus, help and alert messages, and the like, into 15 languages. Most other vendors of operating systems and applications usually only translate their catalog messages into a small set of languages.

In some embodiments, where no translated language message (catalog) files are provided, users are able to process (such as display, layout, read, write, edit, transfer, save) their documents in a preferred language, but they are not able to get translated system/application messages such as user interface menu names, operation instructions, help and warning messages, and the like. An existing compromised method in the AIX operating system to solve this problem is to provide a set of default messages in a default language with a built-in translation substitution mechanism in case no translated message can be found in the AIX operating system. In most cases, the default substituted message is written in English and encoded by ASCII or POSIX standard.

It should be appreciated that such mechanisms as described above are static in nature. That is, the translation is based on a static language/locale environment setting. Table 1 below is an example of static translation substitution showing a list of all translation availabilities for applications operating within a given operating system.

TABLE 1

Example of Static Translation Substitution

| Application | Translated Message in Language X | Translated Message in Language Y | Translated Message in Language Z | Default Language |
|---|---|---|---|---|
| A | Yes | Yes | No | POSIX |
| B | No | Yes | Yes | POSIX |
| C | Yes | No | Yes | POSIX |

In the above example in Table 1, the operating system has X, Y, and Z language settings which an application may use with their textual messages. Moreover, as shown in the example of Table 1, three applications A, B, and C have been installed for use with the operating system. In the example of Table 1, since the message of application A is not translated into language Z, i.e. a corresponding set of messages for application A is not available in a catalog associated with language Z, the application A can only display translated messages under language X and Y. If a user selects and defines language Z for their language/local environment setting, since application A does not have corresponding message translations into language Z, the operating system/application will display default English messages rather than messages in language Z. This is a static translation substitution which guarantees any important instructions/messages can be displayed in at least the default language.

While the static translation mechanisms work for many situations, it should be appreciated that a problem arises when a user only knows languages Y and Z in the above example, and he/she does not understand the default language. In such a case, the user would not understand the messages output in association with application A. Thus, the user would not be able to utilize application A. A similar usability problem is present with applications B and C in the above example with regard to missing languages X and Y, respectively.

This usability problem is common in geographical areas where many different languages are spoken within the same geographical borders, e.g., the greater China area. For example, for most Chinese users, the user may not be able to read and understand English very well, but most people in the area do not have major problems with reading both Simplified Chinese and Traditional Chinese. Similar problems are present in other geographical areas where people use multiple scripts for the same basic language such as using Cyrillic and Latin scripts in the same languages in East Europe and Middle Asia, using Arabic and Latin scripts in the same languages in the Middle East, using Cyrillic and classic Mongolian scripts for Mongolian, and using Gurmukhi and Arabic for Punjabi. The same problem may also be present when multiple scripts are used for multiple languages within the same geographical area, such as with Indic languages in India, for example.

The illustrative embodiments provide mechanisms for addressing these problems. The mechanisms of the illustrative embodiments define a dynamic and automated way to formulate a method to analyze a user's language preference based on the user's language based activities from a variety of sources, dynamically modify the existing static translation substitution based on the results of the analysis of the user's language preference, and to display the messages to match the user's preferred translation substitution. The mechanisms of the illustrative embodiments may make use of user specified preferred language list defining an ordered list of language preferences. Moreover, the mechanisms of the illustrative embodiments may make use of automated mechanisms for automatically determining a user's preferred list of language settings based on user language based activities. The automated mechanism may track the user's language based activities, with the particular language based activities being tracked being possibly specified by the user. The results of the analysis of the language based activities may be used by themselves, or in combination with the user defined list of preferred languages, to generate a dynamically optimized ordered set of preferred language translations. The various elements analyzed as part of the analysis of the language based activities may have associated priorities for contributing to the dynamic analysis results. Thus, the mechanisms of the illustrative embodiments provide a dynamic language translation substitution mechanism.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
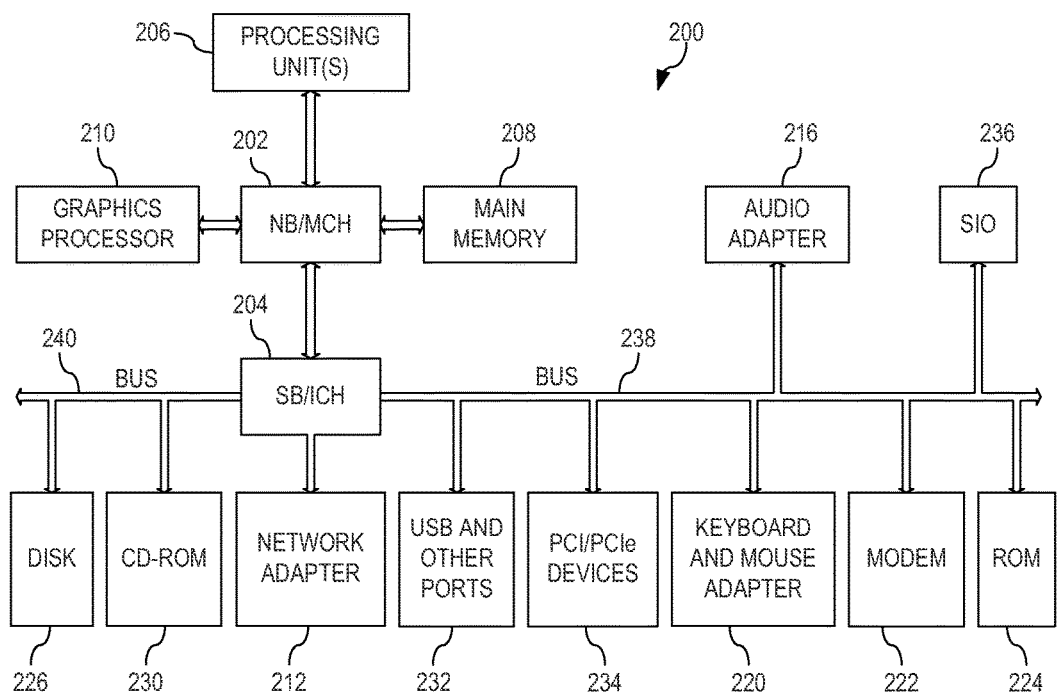
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

The illustrative embodiments may be implemented in a stand-alone computing device, a distributed data processing system, or the like. With a stand-alone computing device implementation, for example, the mechanisms of the illustrative embodiments may execute entirely within a single computing device but may operate on user input received into the single computing device as well as data sent to, and received from, remotely located computing devices, such as web servers or the like, via one or more data networks. In a distributed data processing system implementation, for example, various aspects of the illustrative embodiments may be implemented on different computing devices, such as distributed between one or more server computing devices and one or more client computing devices that communicate with the server computing devices via one or more data networks.

As touched upon above, the illustrative embodiments provide mechanisms for dynamically determining a user's preferred language settings for outputting messages via a user interface, such as a graphical user interface of an operating system, application, or the like, an audible message system, or the like. The dynamic mechanisms of the illustrative embodiments may be utilized with static translation preferences already established in the system and may operate to dynamically modify these static translation preferences when desired. The dynamic mechanisms of the illustrative embodiments analyze the user's own interactions with the computing system and with other computing systems via one or more data networks to make dynamic decisions about the most likely preference of language settings the user would prefer. The dynamically modified user language preferences may then be utilized to determine, for each operating system, application, or the like, which of the dynamically selected preferred languages are supported by the operating system, application, or the like, in the priority order determined by the dynamic mechanisms of the illustrative embodiments and set language translation settings for that operating system, application, or the like (hereafter referred to collectively as "computing system processes") so that the computing system processes utilize a translation catalog files of a translation catalog facility corresponding to the user's dynamically determined preferred languages.

To better understand the operation of the illustrative embodiments, consider a scenario in which a user, Andy, has set his preferred language for use with the operating system and/or applications of a computing device to "Hong Kong English (en_HK.UTF-8)". In accordance with the illustrative embodiments, Andy enables an option in the operating system, application, or runtime environment (which would apply to more than one application and/or the operating system), to utilize dynamic translation substitution with Andy's user profile. In response to the enablement of this option, the illustrative embodiments initiate a language oriented tracking program to track Andy's interactions with the computing device and with other computing devices via one or more data networks.

For example, the language oriented tracking program may track Andy's web surfing activities to determine the output languages of the web sites which Andy accesses or frequents. This tracking may be simply determining a count of web sites accessed by Andy in each of a plurality of languages. However, the tracking may be more complex and may collect information such as language selections that Andy makes with regard to such web sites, a duration of time Andy spends viewing or otherwise accessing web sites output in particular languages, whether or not Andy actively interacts with interface items on the web pages, or the like. All of this information may be collected and factored into a calculation or determination as to the relative priority of language preferences for Andy.

Using a simplified example, assume that the tracking of Andy's web surfing activities indicates that, over a period of time of tracking, Andy viewed 30 web sites output in Simplified Chinese (zn_CN.UTF-8) web sites, 20 web pages output in Traditional Chinese (zh_TW.UTF-8), and 10 web pages output in Japanese (ja_JP.UTF-8). From these results of the tracking performed by the mechanisms of the illustrative embodiments, a preferred language translation substitution sequence is determined which may be used to modify a previously selected preferred language setting, a default language setting, or the like. Such modification may be to adjust the existing preferences, to completely supersede or override the existing preferences where possible, or to operate in conjunction with the existing preferences such that they operate in response to existing preferences not including language translations supported by the operating system, application, runtime environment, or the like.

For example, a preferred language translation substitution sequence for the above example tracking results may be en_HK.UTF-8→zh_CN.UTF-8→zh_TW.UTF-8→ja_JP. UTF-8→POSIX (where POSIX is a default language translation specified in the runtime environment). It should be appreciated that this preferred language substitution sequence may be updated continuously, periodically (such as in accordance with an established schedule for example), or in response to certain predetermined events. The tracking of language based activities may be performed continuously, or for a predetermined period of time, for example, while the actual updating of the preferred language translation substitution can be performed at a different granularity, such as once every week or in response to a user input requesting that the preferred language translation substitution sequence be updated. Alternatively, the updating of the preferred language translation substitution can be done continuously as well.

With this preferred language translation substitution sequence in place, when Andy launches an application, or a message is output by the operating system, the message translation catalog facility of the runtime environment will check Andy's preferred language translation substitution sequence to determine which language to use when outputting the message to the user. This determination may be based on a matching, in priority order, of the preferred languages in the preferred language translation substitution sequence with the available language translations in the message translation catalog files associated with the operating system, application, or the like. Thus, for example, for an application X, if it is known that the application X has an associated message translation catalog files corresponding to Traditional Chinese (zh_TW.UTF-8) and Japanese (ja_JP. UTF-8), but not Simplified Chinese (zh_CN.UTF-8), then using the above preferred language translation sequence, the messages for application X will be output in the Traditional Chinese language using the Traditional Chinese (zh_TW.UTF-8) message translation catalog file. If that message translation catalog file becomes not available, or otherwise is not present, then the Japanese (ja_JP.UTF-8) language translation catalog file will be used in accordance with the priorities specified in the preferred language translation substitution sequence.

In one illustrative embodiment, the dynamically determined preferred language translation substitution sequence may be used if a user specified language translation preference matching the supported language translations for the particular process in question is not available. Thus, for example, if a user has specified Arabic as a preferred language translation, but application X does not support Arabic for message outputs, i.e. there is no Arabic message translation catalog file associated with application X, then the runtime environment may supplement this user specified preferred language with the dynamically determined preferred language translation substitution sequence discussed above. If none of the preferred language translation substitutions are supported by the runtime environment for application X, then a default language translation substitution may be utilized, e.g., POSIX or the like.

Figure 3:
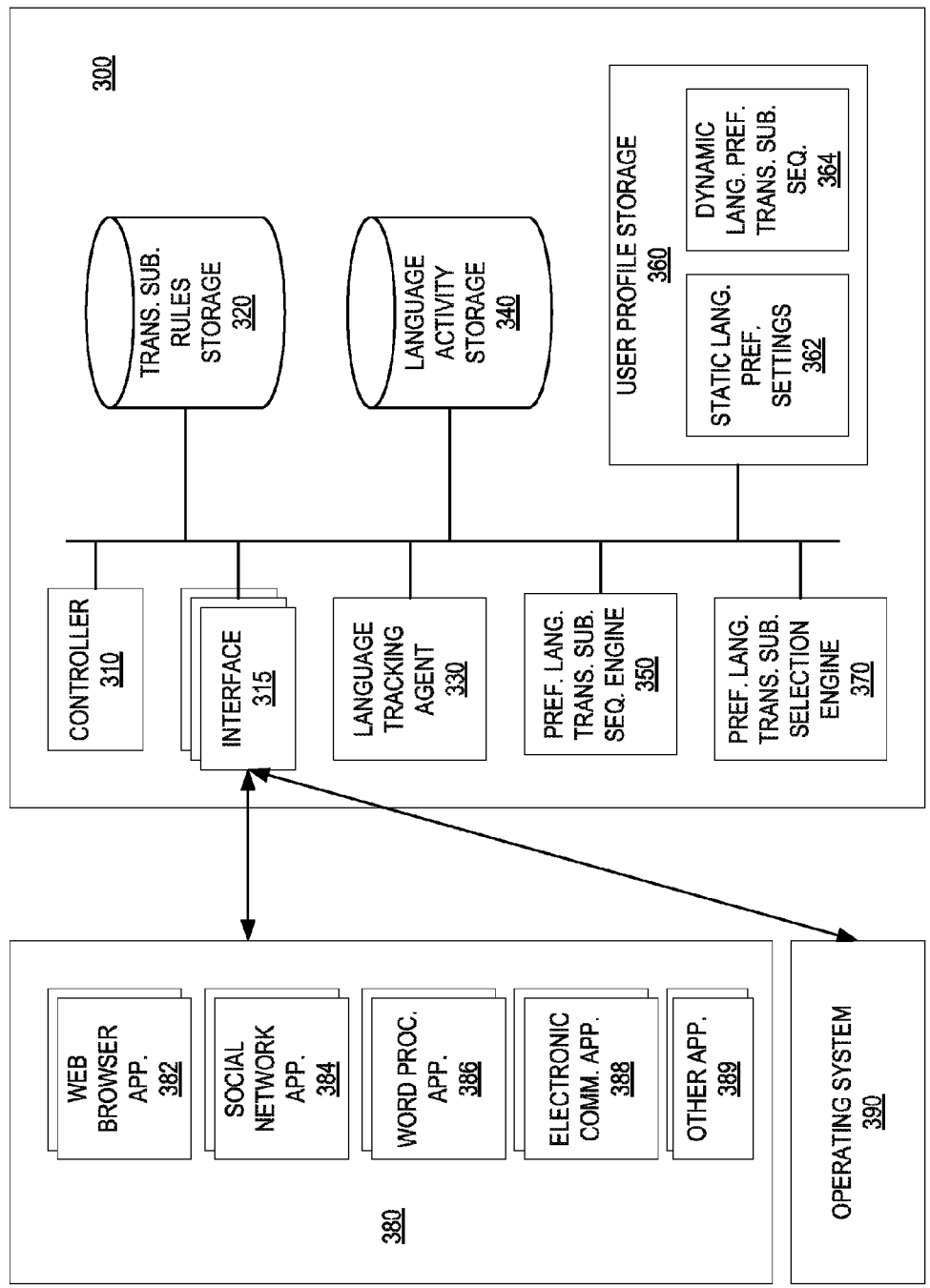
FIG. 3 is an example block diagram illustrating an operation of the primary operational elements of a preferred language translation substitution engine in accordance with one illustrative embodiment.

FIG. 3 is an example block diagram illustrating an operation of the primary operational elements of a preferred language translation substitution engine in accordance with one illustrative embodiment. The elements shown in FIG. 3 may be implemented as software instructions loaded into one or more memories of one or more data processing devices for execution by one or more processors. In other illustrative embodiments, various ones of the elements shown in FIG. 3 may be implemented as hardware circuitry elements of one or more data processing devices. Of course a combination of hardware and software based mechanisms may be used without departing from the spirit and scope of the illustrative embodiments.

As shown in FIG. 3, the preferred language translation substitution engine 300 comprises a controller 310, one or more interfaces 315, a dynamic translation substitution rules data storage 320, a language tracking agent 330, a user language activity data storage 340, a preferred language translation substitution sequence determination engine 350, a user profile storage 360, and a preferred language translation substitution selection engine 370. The controller 310 controls the overall operation of the preferred language translation substitution engine 300 and orchestrates the operation of the other elements 315-370 of the preferred language translation substitution engine 300. The one or more interfaces 315 provides a communication pathway through which the preferred language translation substitution engine 300 may communicate with applications, an operating system, remotely located data processing devices, such as web servers and the like, as well as receive user input and provide various outputs to the user, applications, operating system, remote data processing devices, and/or the like.

The dynamic translation substitution rules data storage 320 stores various rules for specifying how the dynamic translation substitution sequence is to be calculated and generated, how it is to be applied to any statically existing language translation settings, and the like. The following are only examples of some of the rule sets that may be included in the dynamic translation substitution rules data storage 320 in association with a user identifier or user profile. For example, a first set of rules may specify that the user is allowed to manually define a user preferred language translation substitution order, e.g., by selecting preferred languages and a corresponding ranking or priority of these preferred languages relative to one another. If a user defines his/her own preferred language translation substitution order, this user specified preferred language translation substitution order may be given priority over any dynamically generated preferred language translation substitution sequence. Alternatively, the rules may specify that this user specified order may be superseded by a dynamically generated preferred language translation substitution sequence.

In another example set of rules, rules may be specified for defining whether a user can enable the dynamic preferred language translation substitution mechanisms of the illustrative embodiments. That is, in addition to the manual user specified translation substitution settings provided, if any, the mechanisms of the illustrative embodiments may dynamically determine a preferred language translation substitution sequence based on the user's language based activities associated with the operating system, applications, with other data processing devices, and the like. If dynamic preferred language translation substitution mechanisms are enabled by the user, if none of the languages in the manual user specified order of preferred language translation substitution, then the dynamically generated preferred language translation substitution sequence is traversed in order for any languages not in the user's manually specified order and checking those languages for applicability to the particular message source, e.g., application, operating system, or the like.

In still further example rules, a user may specify the particular methods for tracking user language activities and the sources of language activities that are to be monitored. For example, the user may specify that such sources as web pages viewed, electronic mails sent/received, instant messages sent/received, social group postings, locale objects, and the like, as sources that the user wishes to have language activities tracked while other sources, such as word processor applications, are not to be monitored and tracked. The particular way in which such user language activities are tracked may be specified, such as by looking at bodies of emails but not attachments, looking at web page content but not images, or the like. Other sources of language activities and methods for analyzing such activities may be included in such rules without departing from the spirit and scope of the illustrative embodiments.

As another example, the rules may specify one or more algorithms for evaluating the tracked user language activities and calculating a relative priority of the various languages identified in these tracked user language activities. These rules may specify, for example, desired weightings for various types of different tracked user language activities, e.g., the user's input into fields of a web page being weighted more highly than content of the web page or vice versa, user input to an instant messaging system being weighted more heavily than content of received instant messages, languages of emails being more heavily weighted than languages of web pages viewed, or the like. A user may configure these rules/settings which are then stored in the rules storage 320 for application to the tracked user language activities tracked by the language tracking agent 330.

The language tracking agent 330 monitors sources of user language activities and evaluates the user language activities in accordance with the rules stored in the rules storage 320. The language tracking agent 330 generates statistics of the user language activities tracked according to the rules in the rules storage 320 and stores this information in the user language activity data storage 340. These statistics may take many different forms depending upon the particular user language activities being monitored and the source of the user language activities. For example, with regard to web pages, the language tracking agent 330 may monitor the user's interaction with a web browser application 382 to keep track of the web pages viewed by the user. Based on this tracking, a number of web pages viewed in the various different languages may be maintained. Web page language information may be obtained from locale information in web page metadata such as <html xmlns=http://www.w3.org/1999/xhtml xml:lang="zh-CN" lang="zh-CN"> or <html xmlns=http://www.w3.org/1999/xhtml xml:lang="zh-TW" lang="zh-TW">.

When monitoring chat room interactions by a user, the language tracking agent 330 may track and determine the number of conversation sentences used in the chat rooms in each of the different languages. When monitoring an electronic mail client application or instant messaging application, the language tracking agent 330 may determine the number of emails or instant messages sent out by the user in each of the different languages. Other monitoring may include monitoring the number of loads of a specific language locale object by the same user account, language setting information data in various user profiles (e.g., Firefox, Internet Explorer, Mozilla, or other application user profiles), language tag function settings in word editors and processors, and the like.

The results of the tracking and analysis of the user's language based activities is stored in association with an identifier of the user or user profile in the user language activity data storage 340. This information is further analyzed by the preferred language translation substitution sequence determination engine 350 to determine a dynamic preferred language translation substitution sequence, assuming that the rules in the rule storage 320 indicate that the user has enabled such dynamic preferred language translation substitution sequence determinations. The dynamic preferred language translation substitution sequence sets forth a priority sequence of language translation substitutions based on the statistics generated by the language tracking agent 330. The preferred language translation substitution sequence determination engine 350 may apply weightings as specified in the rules of the rule storage 320 to the various statistics to generate a weighted calculation of the relative priorities of the various language translations. Based on this weighted calculation. the preferred language translation substitutions are ordered according to the language translation substitution having the highest priority being first in the sequence, followed by the language translation substitution having a next highest priority, and so on, to thereby define the dynamically generated preferred language translation substitution sequence. This sequence may be updated periodically, continually, or in response to predetermined events, e.g., user input, particular failings in language translations, and the like.

The results of the processing of the preferred language translation substitution sequence determination engine 350 may be used to update the preferred language translation substitution sequence in the user profile 360. As shown in FIG. 3, among other data, the user profile 360 may comprise both static preferred language translation settings 362 and the dynamically generated preferred language translation substitution sequences 364.

The preferred language translation substitution selection engine 370 may apply the static preferred language translation settings 362 and/or the dynamically determined preferred language translation substitution sequence 364 for the user to messages output by applications 380 and/or operating system 390. As shown in FIG. 3, these applications 380 may comprise a variety of different applications that are monitored for user language activities that are tracked by the language tracking agent 330 and whose language translations may be performed according to the static preferred language translation settings 362 and/or the dynamically determined preferred language translation substitution sequence 364. As shown in FIG. 3, these applications 380 may comprise a web browser application 382, social networking application 384, word processing application 386, and electronic communications applications 388, e.g., electronic mail application, instant messaging application, etc.

Thus, the illustrative embodiments provide a mechanism for providing dynamic determinations of a user's preferred language translation substitution sequences based on the user's language based activities. The illustrative embodiments allow greater flexibility for operating systems, applications, and runtime environments to utilize language translations that are most likely understood by the user in situations where user selected language translations are not supported by the operating system, application, or runtime environment for the specific messages being output, or in cases where the default language translation is not understood by the user.

Figure 4:
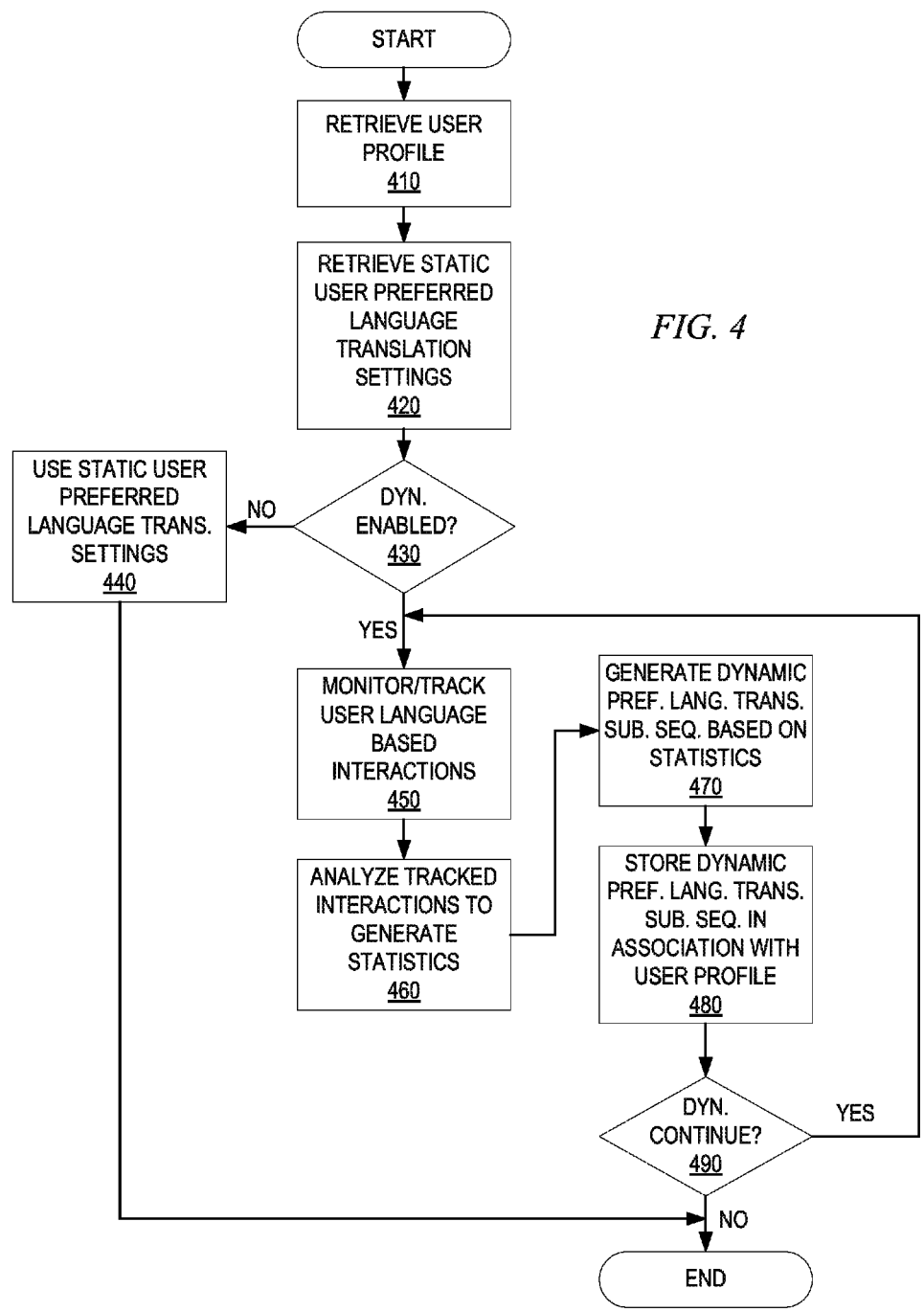
FIG. 4 is a flowchart outlining an example operation for generating a dynamic preferred language translation substitution sequence in accordance with one illustrative embodiment.

FIG. 4 is a flowchart outlining an example operation for generating a dynamic preferred language translation substitution sequence in accordance with one illustrative embodiment. The operation outlined in FIG. 4 may be implemented, for example, by a preferred language translation substitution engine of the illustrative embodiments, for example.

As shown in FIG. 4, the operation starts with a retrieval of a user profile for a particular user of a data processing device (step 410). The particular user may be identified, for example, via a logon process or other identification process. For example, in response to the user powering on the data processing device, a logon process may be initiated in which a user must specify a username, select a certificate, or the like, and optionally provide a password or other private identifier, as is generally known in the art. Assuming that the correct information is provided as part of the logon process, a user profile corresponding to the user name, certificate, or the like, is retrieved for processing in accordance with the operation of FIG. 4.

Having retrieved the user profile, any static user specified preferred language translations are retrieved and stored for use in translating messages from processes executing on the data processing device, or messages output by the data processing device which may have been received from another remotely located data processing device (step 420). A determination is made as to whether dynamic preferred language translation substitution sequence determination has been enabled by the user by looking at a corresponding setting in the user profile and determining if the value of this setting indicates enablement (step 430). If not, then the static user specified preferred language translation settings are utilized and/or a default language translation is utilized with messages that are output by the data processing system (step 440).

If dynamic preferred language translation substitution sequence determination has been enabled, then user language based interactions with processes executing on the data processing device, as well as communications with other remotely located data processing devices, e.g., web servers, chat sites, instant messaging, electronic mail messages, and the like, are monitored and analyzed to identify languages utilized (step 450). This information is analyzed to identify statistical information about the various languages utilized by the user in his/her language based activities using the data processing device (step 460). The particular sources of language based activities to be monitored, the manner for performing the monitoring, and the manner for performing the analysis may be specified in one or more rules associated with the user profile, for example.

Based on the statistical information regarding the various languages utilized by the user in his/her language based activities monitored and tracked, a dynamic preferred language translation substitution sequence is generated based on relative priorities of the various languages identified through the monitoring/tracking (step 470). This dynamic preferred language translation substitution sequence is stored in association with the user profile (step 480). A determination is made as to whether the dynamic monitoring/tracking and generation of the dynamic preferred language translation substitution sequence is to be continued (step 490). Such ending of the dynamic operations of the illustrative embodiments may be determined based on a change to the settings in the user profile so disable the dynamic operations, for example. If the dynamic mechanisms are to be ended, the operation terminates. If continued dynamic monitoring/tracking is to be performed, the operation returns to step 450.

Figure 5:
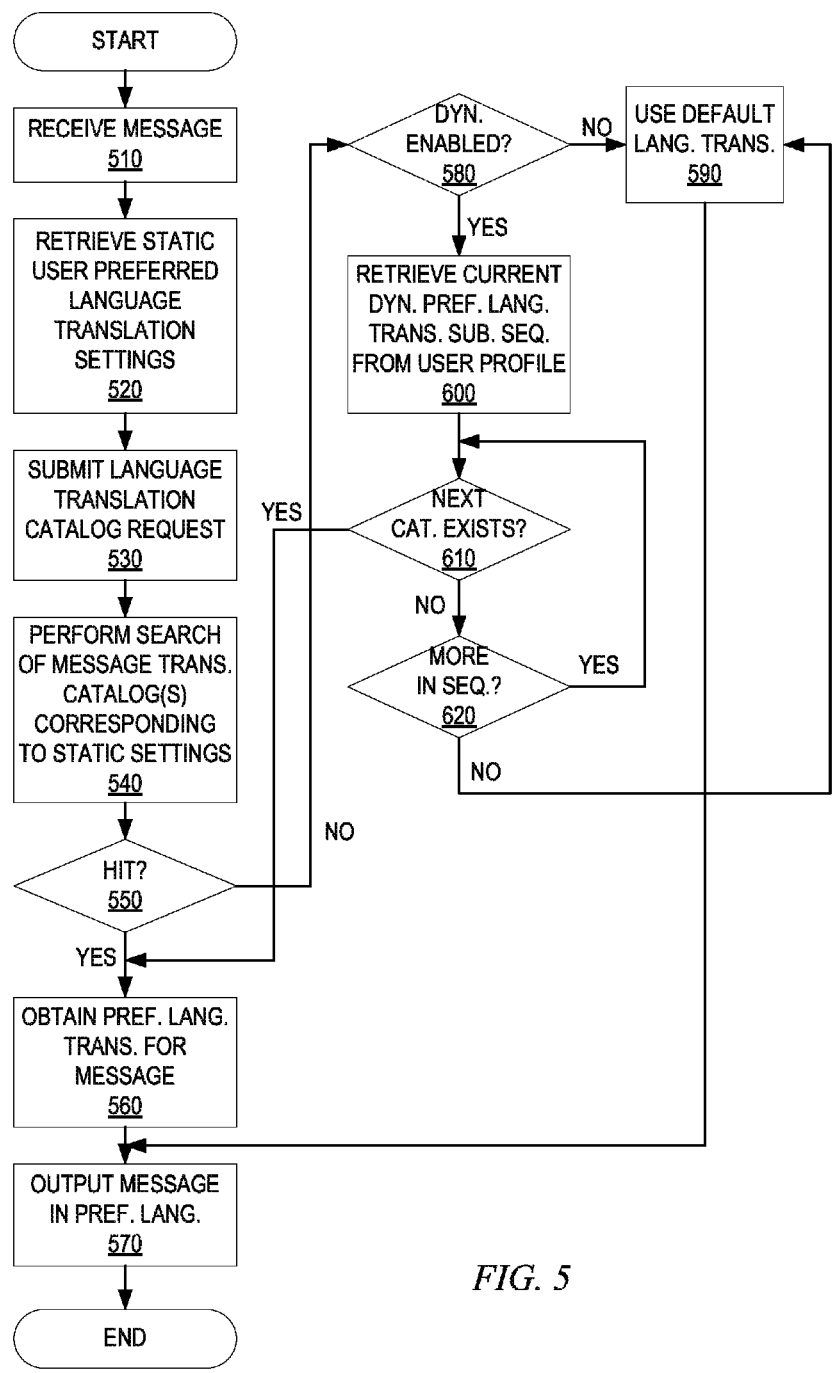
FIG. 5 is a flowchart outlining an example operation for utilizing a dynamic preferred language translation substitution sequence with message output generation in accordance with one illustrative embodiment.

FIG. 5 is a flowchart outlining an example operation for utilizing a dynamic preferred language translation substitution sequence with message output generation in accordance with one illustrative embodiment. Again, the operation outlined in FIG. 5 may be implemented, for example, by a preferred language translation substitution engine of the illustrative embodiments, for example. It is assumed, for purposes of the description of FIG. 5 that a user profile has already been retrieved and loaded based on a user's logon operation, for example.

As shown in FIG. 5, the operation starts by receiving a message output request from a process associated with the data processing system (step 510). This process may be an operating system or application executing on the data processing system, a communication process in which the message is received from a remotely located data processing device, or the like, for example. The user's static language translation settings, if any, are retrieved from the user profile and used to generate a language translation catalog request that requests translation of the received message into the user's statically identified preferred language(s) (step 520). The language translation catalogs associated with the process are accessed by submitting the language translation catalog request to the message catalog mechanisms of the runtime environment of the data processing system (step 530) which performs a search of the message translation catalog(s) corresponding to the static language translation settings of the user (step 540).

A determination is made as to whether the message translation catalog(s) corresponding to the static language translation settings are present in association with the process submitting the message for output on the data processing system (step 550). If so, then the most preferred language translation for the message is obtained (step 560) and the message is output in the preferred language (step 570). The operation then terminates.

If the message translation catalog(s) corresponding to the static language translation settings are not present in association with the process submitting the message for output, a determination is made as to whether the user has dynamic language translation substitution sequencing enabled or not as specified by the user profile (step 580). If dynamic language translation substitution sequencing is not enabled, then a default message translation catalog is loaded and used to output the message (step 590). If dynamic language translation substitution sequencing has been enabled, then the current dynamically generated preferred language translation substitution sequence for the user is retrieved from the user profile (step 600), and a determination is made as to whether the next message translation catalog(s) corresponding to the next dynamically identified language translation substitution in the sequence exists in association with the process submitting the message for output, based on a priority order specified by the sequence (step 610). If so, then the operation continues to step 560 using the identified language translation substitution in the dynamically generated preferred language translation substitution sequence. If not, a determination is made as to whether there are more preferred language translation substitutions in the sequence (step 620). If so, then the operation returns to step 610. If not, then the operation continues on to step 590 where a default message language translation catalog is utilized to translate the message for output.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for translating messages output by processes associated with the data processing system, comprising:
   automatically tracking, by a processor in the data processing system, language based user activities occurring via the data processing system to at least one other data processing system via a communication connection;
   automatically analyzing, by the processor, the language based user activities to determine a relative priority ordering of one or more languages used by a user performing the user activities;
   automatically generating, by the processor, a sequence of preferred language translation substitutions for outputting messages based on results of the analysis, wherein the sequence comprises two or more preferred language translation substitutions for outputting the messages;
   automatically applying, by the processor, the sequence to a received message from a process associated with the data processing system to generate a translated message using one of the preferred language translation substitutions in the sequence of preferred language translation substitutions, wherein the sequence is automatically applied to the received message from the process by overriding a user defined sequence of preferred translation substitutions and giving priority to the automatically sequence and wherein automatically applying the sequence to the received message comprises:

traversing, by the processor, in a sequence order, the preferred language translation substitutions of the sequence;

for each preferred language translation substitution in the sequence order:

determining, by the processor, whether a source of the received message has a translation catalog file corresponding to the first preferred language translation substitution in the sequence order, wherein each translation catalog file comprises a translation in an associated language;

responsive to a failure of the source of the received message having the translation catalog file corresponding to the first preferred language translation substitution in the sequence order, determining, by the processor, whether the source of the received message has a translation catalog file corresponding to the next preferred language translation substitution in the sequence order; and responsive to the source of the received message having the translation catalog file corresponding to the next preferred language translation substitution in the sequence order, selecting, by the processor, the next preferred language translation substitution as a preferred language translation substitution to use in generating the translated message; and generating, by the processor, the translated message using the selected preferred language translation substitution to translate the received message into a different language from a language in which the received message is received; and outputting, by the processor, the translated message via an output device of the data processing system.

2. The method of claim 1, wherein automatically generating a sequence of preferred language translation substitutions comprises modifying, by the processor, an existing static translation substitution based on the results of the analysis.

3. The method of claim 1, wherein the output device is a display device, the received message is a message to be displayed on the display device, and the translated message is a translated message displayed on the display device.

4. The method of claim 1, wherein the output device is an audio output device, the received message is a message to be audibly output by the audio output device, and the translated message is a translated message audibly output by the audio output device.

5. The method of claim 1, wherein generating the translated message comprises utilizing, by the processor, the translation catalog file associated with the source of the received message which matches the selected preferred language translation substitution.

6. The method of claim 1, wherein the received message is received from one of an operating system of the data processing system or an application executing on the data processing system.

7. The method of claim 1, wherein automatically tracking language based user activities occurring via the data processing system comprises at least one of:

tracking, by the processor, the user's accessing of content on one or more data networks and determining the languages of the content accessed by the user;

determining, by the processor, language selections made by the user's input to one or more sources of content on one or more data networks;

determining, by the processor, corresponding counts, for a plurality of languages, of a number of sources of content accessed by the user that provide content in the particular language; and determining, by the processor, for the plurality of languages, an amount of time the user spends viewing content in the particular language.

* * * * *